(12) United States Patent
Sun et al.

(10) Patent No.: US 8,682,271 B2
(45) Date of Patent: Mar. 25, 2014

(54) METHOD AND DEVICE FOR IMPROVING COMMUNICATION DISTANCE ACCURACY OF A TRANSACTION SYSTEM VIA TEMPERATURE COMPENSATION

(75) Inventors: Yingtong Sun, Guangdong (CN); Meixiang Li, Guangdong (CN)

(73) Assignee: Nationz Technologies, Inc., Shenzhen (CN)

( * ) Notice: Subject to any disclaimer, the term of this patent is extended or adjusted under 35 U.S.C. 154(b) by 468 days.

(21) Appl. No.: 13/132,499

(22) PCT Filed: Nov. 2, 2009

(86) PCT No.: PCT/CN2009/074745
§ 371 (c)(1),
(2), (4) Date: Jun. 2, 2011

(87) PCT Pub. No.: WO2010/063208
PCT Pub. Date: Jun. 10, 2010

(65) Prior Publication Data
US 2011/0241840 A1    Oct. 6, 2011

(30) Foreign Application Priority Data
Dec. 3, 2008  (CN) .......................... 2008 1 0217971

(51) Int. Cl.
*H04B 17/00*    (2006.01)
*H04W 24/00*    (2009.01)
*H04W 4/02*    (2009.01)

(52) U.S. Cl.
CPC ............. *H04B 17/0062* (2013.01); *H04W 4/02* (2013.01)
USPC ..................... 455/226.2; 455/456.3; 455/41.1; 455/63.1; 455/410

(58) Field of Classification Search
USPC .................. 455/41.1, 41.2, 410, 456.3, 226.1, 455/226.2, 63.1
See application file for complete search history.

(56) References Cited

U.S. PATENT DOCUMENTS 4,314,251 A * 2/1982 Raab ............................. 342/463
4,559,616 A * 12/1985 Bruder ............................ 365/28
(Continued)

FOREIGN PATENT DOCUMENTS

CN    1808929    7/2006
CN    101303745    11/2008
(Continued)

OTHER PUBLICATIONS

Written Opinion of the International Searching Authority dated (mailed) Feb. 11, 2010, issued in related Application No. PCT/CN2009/074745 for Nationz Technologies, Inc. (4 pgs.).

(Continued)

*Primary Examiner* — Duc M Nguyen
(74) *Attorney, Agent, or Firm* — Finnegan, Henderson, Farabow, Garrett & Dunner, LLP

(57) ABSTRACT

A method for improving communication distance accuracy of a transaction system via temperature compensation includes: storing a reference temperature value and a reference field intensity value in a card read micro-controller (101), wherein a temperature sensor (104) is used for detecting an external ambient temperature; based on a difference between the detected external ambient temperature and the reference temperature value, determining at the card read micro-controller (101) whether to perform temperature compensation to an RF field intensity or an equivalent value of the RF field intensity of a SIM card antenna (203), wherein the RF field intensity and the equivalent value of the RF field intensity are received by a card read antenna (103) and are transmitted to the card read micro-controller through a card read RF module (102); transmitting a distance determination result via the card read RF module (102) to the card read antenna (103), which sends the result to an RF SIM card (200). This invention includes the following benefits: it can improve distance control accuracy of the transaction system under various external temperatures environment and reduce unconscious long-distance card-swiping mis-operation.

8 Claims, 2 Drawing Sheets

(56) References Cited

U.S. PATENT DOCUMENTS

| | | | | |
|---|---|---|---|---|
| 4,619,002 | A | * | 10/1986 | Thro .......................... 455/226.2 |
| 4,642,786 | A | * | 2/1987 | Hansen ........................ 702/153 |
| 6,150,811 | A | * | 11/2000 | Grill et al. ..................... 324/258 |
| 7,263,031 | B2 | * | 8/2007 | Sanoner et al. ................. 367/99 |
| 7,762,469 | B2 | * | 7/2010 | Sueoka et al. ................ 235/492 |
| 7,796,965 | B2 | * | 9/2010 | Moser et al. ............... 455/226.2 |
| 8,476,896 | B2 | * | 7/2013 | Mednikov ................ 324/207.15 |
| 2005/0073450 | A1 | * | 4/2005 | Kim et al. ..................... 341/119 |
| 2006/0158182 | A1 | * | 7/2006 | Omagari et al. ............. 324/244 |
| 2010/0227644 | A1 | | 9/2010 | Yu et al. |
| 2010/0273528 | A1 | | 10/2010 | Yu et al. |

FOREIGN PATENT DOCUMENTS

| | | |
|---|---|---|
| CN | 100573568 | 12/2009 |
| JP | 2007-65977 | 3/2007 |
| WO | WO 2008/056104 | 5/2008 |

OTHER PUBLICATIONS

International Search Report mailed Feb. 11, 2010 for International application No. PCT/CN2009/074745, 3 pages.

* cited by examiner

METHOD AND DEVICE FOR IMPROVING COMMUNICATION DISTANCE ACCURACY OF A TRANSACTION SYSTEM VIA TEMPERATURE COMPENSATION

TECHNICAL FIELD

This invention relates to a recording medium used with a machine, and especially relates to a recording medium with a semiconductor component. It particularly relates to a method and device for improving communication distance accuracy of a transaction system via temperature compensation.

TECHNICAL BACKGROUND

The Subscriber Identity Model ("SIM") used in mobile communication technologies is applied widely as a client identification device of mobile communication terminals. With the development of technologies and science, various intelligent circuit modules are added into the SIM card of an ordinary mobile communication terminal via different kinds of ways to make the SIM card have functionalities closer to the daily life in addition to basic SIM card functionalities. A Radio-Frequency ("RF") SIM card is one of the examples. China Patent No. 200710124354.7 discloses corresponding technologies.

An RF IC card device with high frequencies described in China Patent No. 200710124354.7 adopts active RF technology, which can have mobile payment functions such as E-wallet or consumer application functions such as mobile-phone access pass. But for certain payment application functions, for transaction safety, a wireless communication distance must be controlled within a very small range, such as within a bus or metro, to avoid unconscious long-distance mis-transactions. So communication distance control becomes the most difficult goal to achieve.

The short distance card-swiping mechanism (i.e. a mechanism of constraining the card-swiping distance) of existing RF SIM cards determines the distance through checking parameters of RF power intensity. But this mechanism does not take into account an impact of a temperature (under same emission power, the lower a temperature is, the higher a field intensity value is detected) on RF emission power and detection. Thus, changes to external ambient temperature will affect the accuracy of the distance determination.

SUMMARY OF THE INVENTION

In accordance with the invention, the technical problem to be resolved by this invention is to avoid the shortcomings of the above described existing technologies by providing a method and device for improving distance control accuracy of an RF SIM card transaction system through temperature compensation. After including a temperature detection and compensation mechanism, the distance control accuracy of a transaction system under various external temperatures environment is improved.

This invention provides solutions to the above technical problems including a method for improving communication distance accuracy of a transaction system via temperature compensation. The method is used in communications between a mobile terminal and a card reader in the transaction system. The card reader includes an RF card read device and the mobile terminal includes an RF SIM card. The RF card read device includes a card read micro-controller, a card read FR module, a card read antenna, and a temperature sensor. The method includes following steps:

A. The card read micro-controller reads out a pre-configured reference temperature value. When an ambient temperature is different from the reference temperature value, the card read micro-controller compensates a detected field intensity or an equivalent value of the detected field intensity to reduce differences of the detected field intensity or the equivalent value of the detected field intensity caused by different temperatures.

B. The card read micro-controller reads out a pre-configured field intensity threshold. When the mobile terminal is within a transaction range, a field intensity represented by the detected field intensity or the equivalent value of the detected field intensity is not smaller than a field intensity represented by the pre-configured field intensity threshold.

C. The card read micro-controller reads out, via the RF module, an RF field intensity or an equivalent value of the RF field intensity (of the RF SIM card) received by the card read antenna.

D. The card read micro-controller reads out an ambient temperature detected by the temperature sensor, and analyzes and compares to determine if the detected ambient temperature is different from the pre-configured reference temperature value. If yes, the card read micro-controller performs pre-configured temperature compensation to the read-out field intensity or equivalent value of the field density; otherwise, no temperature compensation is performed.

E. The card read micro-controller determines whether a field intensity represented by the field intensity or the equivalent value of the field intensity, which has been processed at Step D, is bigger than the pre-configured field intensity threshold. If yes, the card read micro-controller provides a suitable distance determination; otherwise, the card read micro-controller provides an unsuitable distance determination.

F. And the card read micro-controller sends the determination result of Step E to the RF SIM card via the card read RF module and the card read antenna.

Regarding the compensation in Step A, the compensation value is an empirical value obtained from an analysis of an impact of a temperature on the RF power and detection. Also, the compensation value can be modified.

The temperature compensation in Step D is performed by the card read micro-controller to the detected RF field intensity value by using a difference between the pre-configured reference temperature and the temperature detected by the temperature sensor.

The pre-configured field intensity threshold in Step B can be modified according to requirements of the transaction system on a communication distance.

In Step E, the card read micro-controller uses parameters corresponding to the RF power intensity to conduct the distance control and determination.

To solve the above technical problem, the invention also adopts a card read device for improving communication distance accuracy of a transaction system via temperature compensation, which is used for communications between a mobile terminal and a card reader in the transaction system:

The card read device includes a card read micro-controller, a card read RF module, a card read antenna, and a temperature sensor.

The temperature sensor is used for detecting an external ambient temperature. Based on the external ambient temperature detected by the temperature sensor, the card read micro-controller determines whether to conduct temperature compensation to a field intensity or an equivalent value of the field intensity of transmission signals of a SIM card antenna. The field intensity and the equivalent value of the field intensity signals are received by the card read antenna and are transmitted to the card read micro-controller through the card read RF module. The card read micro-controller transmits a distance determination result, via the card read RF module, to the card read antenna, which sends the result to an RF SIM card.

The temperature sensor can either transmit detected temperature data via the card read RF module to card read micro-controller or transmit the data to the card read micro-controller directly.

Comparing to existing technologies, this invention has following benefits: after the temperature detection and compensation mechanism is included, the distance control accuracy of the transaction system under various external temperatures environment can be improved, and unconscious long-distance card-swiping mis-operations can be reduced.

DESCRIPTION OF THE EMBODIMENTS

Further detailed description of this invention is provided as follows in combination with the attached figures.

Figure 1:
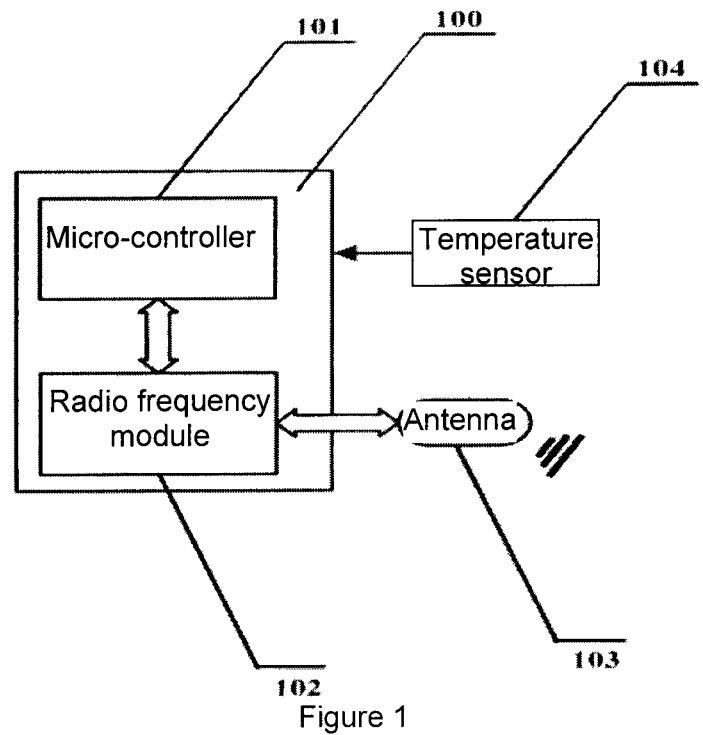
FIG. 1 is a block diagram illustrating an internal logical structure of an RF card read device in accordance with the invention.
Figure 2:
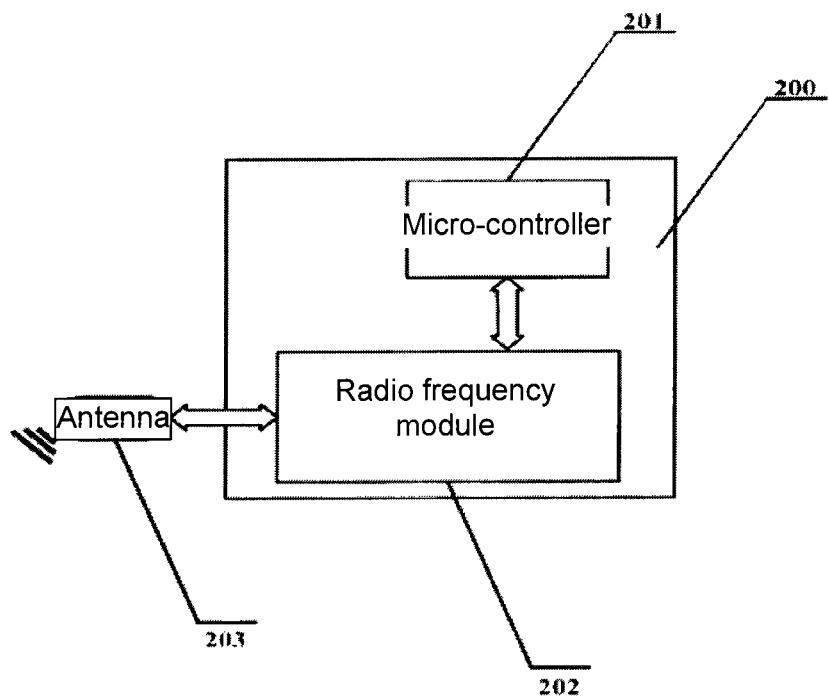
FIG. 2 is a block diagram illustrating an internal logical structure of an RF SIM card in accordance with the invention.

Referring to FIGS. 1 and 2, this invention provides a method for improving communication distance accuracy of a transaction system via temperature compensation. The transaction system includes a card reader and a mobile terminal. The card reader includes an RF card read device 100 and the mobile terminal includes an RF SIM card 200. The RF card read device 100 includes a card read micro-controller 101, a card read RF module 102, a card read antenna 103, and a temperature sensor 104. The method includes the following steps:

A. Card read micro-controller 101 reads out a pre-configured reference temperature value. When an ambient temperature is different from the reference temperature value, the card read micro-controller compensates the detected field intensity or an equivalent value of the detected field intensity to reduce differences of the detected field intensity or the equivalent value of the detected field intensity caused by different temperatures.

B. Card read micro-controller 101 reads out a pre-configured field intensity threshold. When mobile terminal is within a transaction range, a field intensity represented by the detected field intensity or the equivalent value of the detected field intensity is not smaller than a field intensity represented by the pre-configured field intensity threshold.

C. Card read micro-controller 101 reads out, via card read RF module 102, an RF field intensity or an equivalent value of the RF field intensity (of RF SIM card 200) received by card read antenna 103.

D. Card read micro-controller 101 reads out an ambient temperature detected by temperature sensor 104, and analyzes and compares to determine if the detected ambient temperature is different from the pre-configured reference temperature value. If yes, card read micro-controller 101 performs pre-configured temperature compensation to the read-out field intensity or equivalent value of the field intensity; otherwise, no temperature compensation is performed.

E. Card read micro-controller 101 determines whether the compensated field intensity or equivalent value of the field intensity processed by Step D is bigger than the pre-configured field intensity threshold. If yes, card read micro-controller 101 provides a determination of a suitable distance; otherwise, card read micro-controller 101 provides a determination of not a suitable distance.

F. And card read micro-controller 101 transmits the determination result of Step E to RF SIM card 200 via card read RF module 102 and card read antenna 103.

Regarding the compensation in Step A, the compensation value is an empirical value obtained from an analysis of an impact of a temperature on the RF power and detection. Also, the compensation value can be modified.

The temperature compensation in Step D is done by card read micro-controller 101 to the detected RF field intensity value by using a difference between the pre-configured reference temperature and the temperature detected by temperature sensor 104.

The pre-configured field intensity threshold in Step B can be modified according to requirements of the transaction system on a communication distance.

In Step E, card read micro-controller 101 uses parameters corresponding to the RF power intensity to conduct the distance control and determination.

In this invention, a card read device for improving communication distance accuracy of a transaction system via temperature compensation is used for communications between a mobile terminal and a card reader in the transaction system. The card read device includes a card read micro-controller 101, a card read RF module 102, a card read antenna 103, and a temperature sensor 104.

Temperature sensor 104 is used for detecting an external ambient temperature. Based on the external ambient temperature detected by temperature sensor 104, card read micro-controller 101 determines whether to perform temperature compensation to a field intensity or an equivalent value of the field intensity of transmission signals of a SIM card antenna 203. The field intensity and the equivalent value of the field intensity signals are received by card read antenna 103 and are transmitted to the card read micro-controller through card read RF module 102. Card read micro-controller 101 transmits a distance determination result via card read RF module 102 to card read antenna 103, which sends the result to RF SIM card 200.

Temperature sensor 104 can either transmit detected temperature data via card read RF module 102 to card read micro-controller 101 or transmit the data to card read micro-controller 101 directly.

Figure 3:
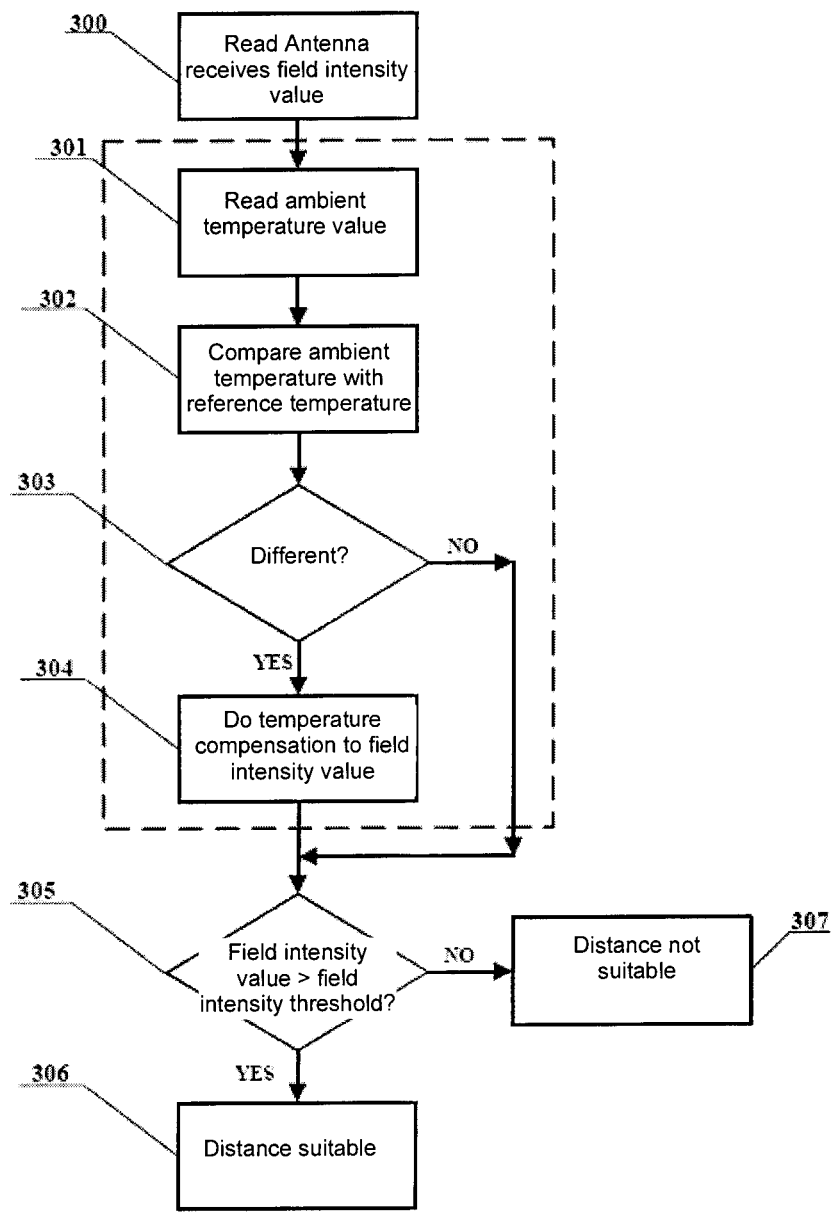
FIG. 3 is a flow chart illustrating an exemplary process for temperature compensation in accordance with the invention.

Referring to FIG. 3, an exemplary process in accordance with the disclosed embodiments includes:

Step 1: at process 300, card read micro-controller 101 uses card read RF module 102 to detect an RF field intensity or an equivalent value of the RF field intensity, both of which are emitted by RF SIM card 200 and are received by card read antenna 103;

Step 2: at process 301, card read micro-controller 101 reads out an ambient temperature;

Step 3: at process 302, card read micro-controller 101 compares the ambient temperature with a reference temperature;

Step 4: at process 303, card read micro-controller 101 analyzes a difference between the ambient temperature and the reference temperature;

Step 5: at process 304, card read micro-controller 101 performs temperature compensation to the RF field intensity or the equivalent value of the RF field intensity based on the analysis result of process 303;

Step 6: at process 305, card read micro-controller 101 compares and determines whether the RF field intensity or the equivalent value of the RF field intensity is greater than a field intensity threshold;

Step 7: at process 306 (yes-branch), card read micro-controller 101 provides a suitable distance determination and informs RF SIM card 200; and Step 8: at process 307 (no-branch), card read micro-controller 101 provides an unsuitable distance determination and informs RF SIM card 200.

The above described embodiments are examples of preferable implementation mode of this invention. Those skilled in the art can make various modifications and substitutions, which are within the scope of this invention.

What is claimed is:

1. A method for improving communication distance accuracy of a transaction system via temperature compensation is used for communications between a mobile terminal and a card reader in the transaction system, wherein the card reader includes an radio-frequency ("RF") card read device and the mobile terminal includes an RF SIM card, and wherein the RF card read device includes a card read micro-controller, a card read RF module, a card read antenna, and a temperature sensor, the method includes following steps:
   A. reading out a pre-configured reference temperature value via the card read micro-controller, wherein when an ambient temperature is different from the pre-configured reference temperature value, the card read micro-controller compensates a detected field intensity or an equivalent value of the detected field intensity to reduce a field intensity difference caused by different temperatures;
   B. reading out a pre-configured field intensity threshold via the card read micro-controller;
   C. reading out by the card read micro-controller, via the RF module, an RF field intensity or an equivalent value of the RF field intensity of the RF SIM card, which is received by the card read antenna;
   D. reading out via the card read micro-controller an ambient temperature detected by the temperature sensor, and determining if the detected ambient temperature is different from the pre-configured reference temperature value; if yes, performing pre-configured temperature compensation to the read-out field intensity or equivalent value of the field intensity;
   E. determining via the card read micro-controller whether the compensated field intensity or equivalent value of the field intensity processed by Step D is bigger than the pre-configured field intensity threshold; if yes, providing a suitable distance determination; otherwise, providing an unsuitable distance determination; and
   F. transmitting the distance suitability determination of Step E to the RF SIM card by the card read micro-controller via the card read RF module and the card read antenna.

2. The method of claim 1, wherein: regarding the compensation in Step A, the compensation value is an empirical value obtained from an analysis of an impact of a temperature on RF power and detection, and the compensation value can be modified.

3. The method of claim 1, wherein: the temperature compensation in Step D is performed by the card read micro-controller to the detected RF field intensity value by using a difference between the pre-configured reference temperature and the temperature detected by the temperature sensor.

4. The method of claim 1, wherein: the pre-configured field intensity threshold in Step B can be modified according to requirements of the transaction system on a communication distance.

5. The method of claim 1, wherein: at Step E, the card read micro-controller uses parameters corresponding to RF power intensity to conduct the distance control and determination.

6. A card read device for improving communication distance accuracy of a transaction system via temperature compensation is used for communications between a mobile terminal and a card reader in the transaction system, the card read device comprising:
   a card read micro-controller;
   a card read RF module;
   a card read antenna; and
   a temperature sensor;
   wherein:
   the temperature sensor is used for detecting an external ambient temperature;
   the card read micro-controller determines whether to perform temperature compensation to a field intensity or an equivalent value of the field intensity of transmission signals of a SIM card antenna based on the external ambient temperature detected by the temperature sensor, wherein the field intensity or the equivalent value of the field intensity signals is received by the card read antenna and is transmitted to the card read micro-controller through the card read RF module; and
   the card read micro-controller transmits a distance determination result via the card read RF module to the card read antenna, which sends the result to an RF SIM card.

7. The card read device of claim 6, wherein: the temperature sensor can either transmit detected temperature data to the card read micro-controller via the card read RF module or transmit the detected temperature data to the card read micro-controller directly.

8. A method for improving communication distance accuracy of a transaction system via temperature compensation for communications between a card reader and a mobile terminal including a radio-frequency ("RF") SIM card, the method comprising:
   detecting an RF field intensity of the RF SIM card of the mobile terminal or an equivalent value of the RF field intensity;
   detecting an ambient temperature;
   comparing the detected ambient temperature with a pre-configured reference temperature value to analyze whether the detected ambient temperature is different from the pre-configured reference temperature value;
   based on the analysis, compensating the detected RF field intensity or the equivalent value of the detected RF field intensity to reduce a field intensity difference caused by different temperatures;
   determining whether the compensated RF field intensity or equivalent value of the RF field intensity is greater than a pre-configured field intensity threshold; and
   based on the determination, ascertaining whether the mobile terminal is within a suitable distance for a transaction.

* * * * *